US010616353B2

(12) United States Patent
Shalita et al.

(10) Patent No.: US 10,616,353 B2
(45) Date of Patent: Apr. 7, 2020

(54) SOCIAL SIGNATURE

(71) Applicant: Facebook, Inc., Menlo Park, CA (US)

(72) Inventors: Alon Michael Shalita, Menlo Park, CA (US); Sergey Pupyrev, Menlo Park, CA (US); Igor Kabiljo, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 219 days.

(21) Appl. No.: 15/265,612

(22) Filed: Sep. 14, 2016

(65) Prior Publication Data

US 2018/0077251 A1 Mar. 15, 2018

(51) Int. Cl.
*H04L 29/08* (2006.01)
*G06F 16/9032* (2019.01)
(Continued)

(52) U.S. Cl.
CPC .......... *H04L 67/22* (2013.01); *G06F 16/248* (2019.01); *G06F 16/285* (2019.01); *G06F 16/335* (2019.01); *G06F 16/337* (2019.01); *G06F 16/338* (2019.01); *G06F 16/3346* (2019.01); *G06F 16/358* (2019.01); *G06F 16/437* (2019.01); *G06F 16/9024* (2019.01);
(Continued)

(58) Field of Classification Search
CPC .......... G06F 17/30699; G06F 17/3097; G06F 17/30598; G06F 16/90324; G06F 16/9024; G06F 16/3346; G06F 16/437; G06F 16/358; G06F 16/338; G06F 16/337; G06F 16/335; G06F 16/285; G06F 16/248; G06Q 50/01; H04L 67/22; H04L 67/306; H04L 67/1093; H04L 67/1085; G06N 20/00; G06N 5/022
See application file for complete search history.

(56) References Cited

U.S. PATENT DOCUMENTS 8,606,787 B1 * 12/2013 Asgekar ............ G06F 17/30598
707/737
8,639,706 B1 * 1/2014 Bilinski ............ G06F 17/30749
707/752

(Continued)

OTHER PUBLICATIONS

Dhillon, Inderjit S., Fan, James, Guan, Yuqiang, "Efficient Clustering of Very Large Document Collections;" 2001, https://link.springer.com/chapter/10.1007/978-1-4615-1733-7_20.*

(Continued)

*Primary Examiner* — John A Follansbee
*Assistant Examiner* — Lam T Do
(74) *Attorney, Agent, or Firm* — FisherBroyles, LLP

(57) ABSTRACT

The disclosure is directed to determining a social signature of a user of an application, e.g., a social networking application. The social signature can be a representation of social properties of a person, and can be determined based on various factors, e.g., user profile of the user and friends of the user. The social signature can be used for various applications, e.g., determining socially similarity of a user pair and determining if a user is a spammer. The social signature is determined as a vector of k buckets in which each of the k buckets indicates a count of friends of the user assigned to the corresponding bucket. A social similarity of a user pair is determined as a function of the social signatures of the user pair. A user is determined as likely to be a spammer if the social signature of the user is of a specified pattern.

20 Claims, 14 Drawing Sheets

(51) Int. Cl.

| | | |
|---|---|---|
| *G06F 16/901* | (2019.01) | |
| *G06F 16/33* | (2019.01) | |
| *G06F 16/435* | (2019.01) | |
| *G06F 16/35* | (2019.01) | |
| *G06F 16/338* | (2019.01) | |
| *G06F 16/335* | (2019.01) | |
| *G06F 16/28* | (2019.01) | |
| *G06F 16/248* | (2019.01) | |
| *G06N 20/00* | (2019.01) | |
| *G06N 5/02* | (2006.01) | |
| *G06Q 50/00* | (2012.01) | |

(52) U.S. Cl.
CPC ....... *G06F 16/90324* (2019.01); *G06N 5/022* (2013.01); *G06N 20/00* (2019.01); *G06Q 50/01* (2013.01); *H04L 67/1085* (2013.01); *H04L 67/1093* (2013.01); *H04L 67/306* (2013.01)

(56) References Cited

U.S. PATENT DOCUMENTS

| | | | | |
|---|---|---|---|---|
| 8,694,302 | B1* | 4/2014 | Ho | G06F 17/5036 |
| | | | | 703/13 |
| 8,761,512 | B1* | 6/2014 | Buddemeier | G06K 9/6282 |
| | | | | 382/181 |
| 9,280,597 | B2* | 3/2016 | Ghosh | G06F 17/30728 |
| 9,332,031 | B1* | 5/2016 | Kappiah | G06F 17/40 |
| 2010/0313264 | A1* | 12/2010 | Xie | H04L 63/101 |
| | | | | 726/22 |
| 2011/0208714 | A1* | 8/2011 | Soukal | G06F 17/30864 |
| | | | | 707/709 |
| 2011/0246574 | A1* | 10/2011 | Lento | G06Q 10/10 |
| | | | | 709/204 |
| 2012/0158851 | A1* | 6/2012 | Kelmenson | G06Q 50/01 |
| | | | | 709/205 |
| 2012/0179764 | A1* | 7/2012 | Erdal | G06Q 50/01 |
| | | | | 709/206 |
| 2013/0013682 | A1* | 1/2013 | Juan | G06Q 50/01 |
| | | | | 709/204 |
| 2014/0067826 | A1* | 3/2014 | Jackson | G06F 17/30699 |
| | | | | 707/748 |
| 2015/0082448 | A1* | 3/2015 | Elovici | G06Q 10/107 |
| | | | | 726/26 |
| 2015/0127653 | A1* | 5/2015 | Keng | G06F 17/30598 |
| | | | | 707/740 |
| 2015/0180913 | A1* | 6/2015 | Kanter | H04L 67/306 |
| | | | | 709/204 |
| 2017/0185690 | A1* | 6/2017 | Raichelgauz | G06F 17/30029 |
| 2017/0228418 | A1* | 8/2017 | Levin | G06F 17/30377 |
| 2017/0262587 | A1* | 9/2017 | Agarwal | G06F 19/325 |

OTHER PUBLICATIONS

Moh, Teng-Sheng, Murmann, Alexander J. "Can You Judge a Man by His Friends?—Enhancing Spammer Detection on the Twitter Microblogging Platform Using Friends and Followers;" 2010, https://link.springer.com/content/pdf/10.1007%2F978-3-642-12035-0_21.pdf.*

Nicoara, Daniel, Kamali, Shahin, Daudjee, Khuzaima, Chen, Lei, "Hermes: Dynamic Partitioning for Distributed Social Network Graph Databases;" Mar. 23, 2015, https://openproceedings.org/2015/conf/edbt/paper-218.pdf.*

Hanneman, Robert A., Riddle, Mark, "Introduction to social network methods;" Jun. 9, 2005, https://web.archive.org/web/20050609002126/http://faculty.ucr.edu/~hanneman/nettext/C5_%20Matrices.html.*

Altingovde, Ismail, Sengor, Subakan, Ozlem, Nurcan, Subakan, Ulusoy, Ozgur, "Cluster Searching Strategies for Collaborative Recommendation Systems," Nov. 3, 2012 http://www.cs.bilkent.edu.tr/~oulusoy/ipm2013.pdf (Year: 2012).*

Das, Joydeep, Majumder, Subhashis, Clustering-Based Recommender System Using Principles of Voting Theory, Nov. 2014, https://www.researchgate.net/publication/266475973_Clustering-Based_Recommender_System_Using_Principles_of_Voting_Theory (Year: 2014).*

Gong, SongJie, "A Collaborative Filtering Recommendation Algorithm Based on User Clustering and Item Clustering," Jul. 2010, https://pdfs.semanticscholar.org/ba95/ca14613f9c8dd8412dd108ae4fcb593ca040.pdf (Year: 2010).*

Chiu, Sheng-Min, Chen, Chung-Yi, Su, Heng-Yi, Hsu, Yu-Liang, "Finding Similar Users in Social Networks by Using the Depth-k Skyline Query," 2015, https://ieeexplore.ieee.org/document/7216833 (Year: 2015).*

Whitman, Brian, Lawrence, Steve, "Inferring Descriptions and similarity for music from community metadata;" 2002, http://citeseerx.ist.psu.edu/viewdoc/summary?doi=10.1.1.131.1237 (Year: 2002).*

Gao, Huiying, "User Preference-oriented Collaborative Recommendation Algorithm in E-commerce;" Jul. 2014, http://www.jsoftware.us/vol9/jsw0907-25.pdf (Year: 2014).*

Knees, Peter, Schedl, Markus, "A survey of music similarity and recommendation from music context data," Dec. 2013, https://dl.acm.org/citation.cfm?id=2542206 (Year: 2013).*

Harper, F. Maxwell, Sen, Shilad, Frankowski, Dan, "Supporting Social Recommendations with Activity-Balanced Clustering," Oct. 19, 2007, https://dl.acm.org/citation.cfm?id=1297262 (Year: 2007).*

Toma, Andrei, Constantinescu, Radu, Nastase, Floarea, "Recommendation system based on the clustering of frequent sets," May 2009, https://dl.acm.org/citation.cfm?id=1558803 (Year: 2009).*

* cited by examiner

SOCIAL SIGNATURE

BACKGROUND

Social networking applications enable groups of people to connect with each other and share information online. The groups can share common attributes, e.g., a same city, country, workplace, profession. The groups can be from different parts of the world, or different walks of life. Social networking applications can also recommend a user of the application to connect with another user, e.g., by sending friend suggestions to the user. The social networking application can determine the friend suggestion based on user characteristics of the users. For example, the social networking application can suggest a first user to become friends with a second user because second user is a friend of a friend of the first user, the second user went to same school as the first user, or lived in the same city as the first user. If there are multiple users to be suggested, the social networking application can rank the users to be suggested based on some common user characteristics with the first user.

Some social networking applications use clustering tools to categorize users into buckets such that similar users may be categorized to the same bucket. For example, to determine whether two users are similar, the tool identifies the buckets to which the user identification (ID) of the users are assigned, and if the assigned bucket ID of both the users is the same, the tool determines that there is a high probability that the users are similar. For example, the users may be friends, or friends of friends. In some cases they may not be similar, but most likely, the clustering process categorized them together into the same bucket just because it was beneficial based on some properties of the users. A problem with such a tool is that whenever two people are not in the same bucket, the tool does not offer much data to interpret the similarity between the users. Therefore, if one of the two users is assigned to bucket $B_5$ and the other of the two users to bucket $B_9$, the two users can be most likely complete strangers to each other, or could be good friends but the clustering process could not fit them in the same bucket. In some clustering processes, on an average a fair percentage of the friends of a user can be assigned to different buckets. Therefore, the fact that two users are not assigned to the same bucket may not be useful information for determining the similarity of the users, and concluding that they are not similar may not be a true statement. Accordingly, the tools provided by current social networking applications for determining whether two users are similar may not be accurate and/or are faulty.

DETAILED DESCRIPTION

Figure 1:
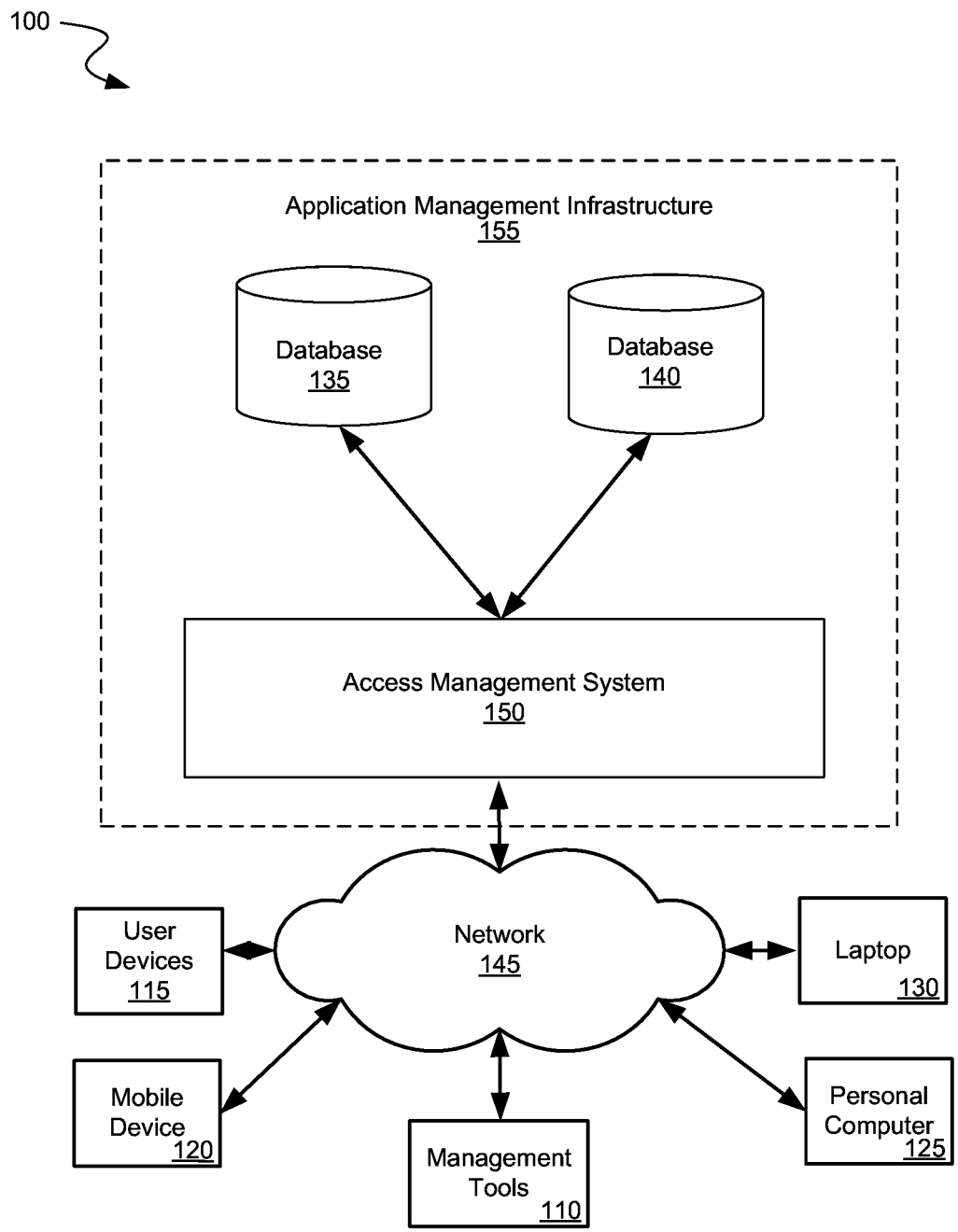
FIG. 1 is a block diagram illustrating an environment in which the disclosed embodiments may be implemented.

Embodiments are disclosed for determining a social signature of a user of an application, e.g., a social networking application. The social signature can be a representation of social properties of a person, and can be determined based on various factors, e.g., user profile of the user and user profile of friends of the user. The social signature can be used for various applications, e.g., to rank friends of a user, to determine if a user is a spammer, and to determine how socially similar are two users. In some embodiments, the social signature of a user is determined based on information regarding a set of users who are friends, connected to and/or associated with the user. In some embodiments, a social similarity between a pair of users can be determined based on information regarding the friends of each of the pair of users. For example, the social signature of the pair of users can be compared to determine the social similarity between the pair of users. The social similarity can indicate a degree of similarity, or is a measure of how socially similar are the pair of users regardless of whether they are friends, connected to and/or associated with each other in the social networking application or in real life. For example, if the pair of users has a high degree of social similarity, it can be because the pair of users is from the same hometown, same age, did the same type of work, went to same school or college, etc. An old adage is "tell me who your friends are, and I'll tell you who you are." In some embodiments, the social similarity determined using information regarding the friends of each of the pair of users is more accurate than the one determined using information regarding the pair of users.

The social signature can be determined using multiple implementations. In a first implementation, each of the users of the application is assigned/categorized/mapped to one of k clusters or buckets using a clustering method, e.g., a spherical k-means clustering method or a variation thereof, a user-defined method. The assignment is done such that users with similar social properties are assigned to the same bucket. Consider that information regarding the users of the application is represented as a graph in which the users are represented as vertices of the graph and a connection or association between the users is represented as an edge between a pair of vertices representing the users. The clustering method can assign each of the users to one of multiple buckets, e.g., k buckets, where k is a specified number, e.g., "3," "5," "100," "1000," or "21000." Further, the clustering method can define that the clusters may be of the same size or approximately the same size. The clustering method can take the graph, partition it into k buckets, such that each of these buckets has the same size and most of the connections between the vertices in a specified bucket are fully contained within the specified bucket, and the connections across different buckets are minimized. For example, consider that k is "21000" and the number of users in the application is 2 billion, each one of the buckets will have approximately "100,000" users. If the clustering method ensures that the edges between the vertices corresponding to the users in the buckets are within the buckets and are not across the buckets, the users categorized/assigned to a specified bucket can form a well-connected set of users, e.g., small communities of users such as users within the same neighborhood or small towns. The higher the k the better-connected the users categorized to the bucket are, the clustering method groups together people who are similar to each other in a narrowed way. After the clustering process is complete, each of the users in the application is assigned to one of multiple buckets. For example, a user with user identification "U4" is assigned to bucket $B_5$ and user "U20" is assigned to bucket $B_6$.

A social signature of a user can be determined based on the bucket assignment of the user's friends. In some embodiments, the social signature can be determined as a vector that is k elements wide in which k is the number of buckets. Further, each of the k elements indicates a count of friends of the user assigned to the corresponding bucket. For example, if k is "3" and the number of friends of a user assigned to a first bucket is "20", to a second bucket is "10" and to a third bucket is "0," then the social signature for the user can be represented as "$S_u$=[20, 10, 0]."

The embodiments can determine a social similarity between a pair of users by comparing the social signature of the pair of users. The embodiments can use various comparing functions. For example, the embodiments can use a cosine similarity function, which can determine the social similarity between the pair of users by applying a cosine function on their social signatures. The social similarity can take a value that is within a range, e.g., "0" to "1" in which a value closer to "1" indicates a high degree of social similarity between the pair of users and a value closer to "0" indicates a low degree of social similarity between the pair of users.

The embodiments can also determine if a user is a spammer using the social signature of the user. In some embodiments, the buckets to which the friends of the users are assigned are identified, and the buckets are sorted based on a sorting function, e.g., based on the number of friends in each of the buckets, to generate a sorted graph. If the sorted graph is of a specified pattern, e.g., a pattern that is typical of a spammer, the user is determined as likely to be a spammer.

In a second implementation, a clustering method partitions the graph depicting the users and the connections between the users iteratively to generate a tree of nodes until k number of nodes are formed in the leaf nodes. For example, the clustering method can use a balanced graph partitioning method to partition the graph. The clustering method works by splitting the graph into two nodes such that the vertices are equally split into the two nodes while maintaining most of the connections between the vertices in a node within the node. Each of the two nodes is again split into further two nodes and so on until k number of nodes is formed in the leaf nodes. After the clustering method completes partitioning the graph, each of the users of the application is assigned to one of the k nodes in the leaf level of the tree. The social similarity between a pair of users is determined based on a hierarchical distance between the leaf level and a nearest parent node that is common to the leaf level nodes corresponding to the pair of users. The nearer the common parent node is to the leaf level of the tree, the more similar the two users are. In some embodiments, the social similarity can also be determined based on a distribution of friends, e.g., a social signature, of each of the pair of users among the k buckets. The embodiments determine the social signature of the pair of the users as described above, e.g., as a vector of number of friends mapped to each of the k buckets, and compare them using a comparing function, e.g., earthmover's distance function. The comparing function can determine the distance either of the distributions of friends has to be moved to make the distributions identical. The distance between the two distributions can indicate how similar the pair of users is. In some embodiments, the larger the distance the lesser is the social similarity between the pair of users.

While the above embodiments are described with respect to determining a social similarity between users of an application, they can also be used to determine similarities between other entities, e.g., web pages in Internet, that have one or more properties or characteristics which distinguish each other and have some relationship between each other.

Turning now to the figures, FIG. 1 depicts a block diagram illustrating an environment 100 in which the disclosed embodiments may be implemented. Companies can generate and store a tremendous amount of data (e.g., photographs, messages, e-mails, electronic documents, or healthcare records) and related analytics (e.g., usage analytics). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. In some embodiments, an application, e.g., a social networking application, can be implemented using the application management infrastructure 155 that the end-users can access to perform various activities, e.g., social networking activities, such as posting comments, sharing pictures, videos. The end-users can access the application from user device 115 associated with the end-users via the access management system 150.

User device 115 can be any computing device capable of receiving user input as well as transmitting and/or receiving data via the network 145. The user device 115 can be a conventional computer system, such as a desktop 125 or a laptop computer 130, a mobile device 120, a smartphone, a wearable device, or a similar device. The user device 115 is configured to communicate with access management system 150 via the network 145. In some embodiment, user device 115 executes an application, e.g., a mobile app, allowing a user of the user device 115 to interact with the access management system 150 to access the social networking application. For example, the user device 115 can execute a browser application to enable interaction between the user device 115 and access management system 150 via the network 145. In another embodiment, user device 115 interacts with access management system 150 through an application programming interface (API) that runs on the native operating system of the user device 115.

The user device 115 can be configured to communicate via the network 145, which may comprise any combination of local area and/or wide area networks, using both wired and wireless communication systems. In some embodiments, the network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 145 may be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

Figure 2:
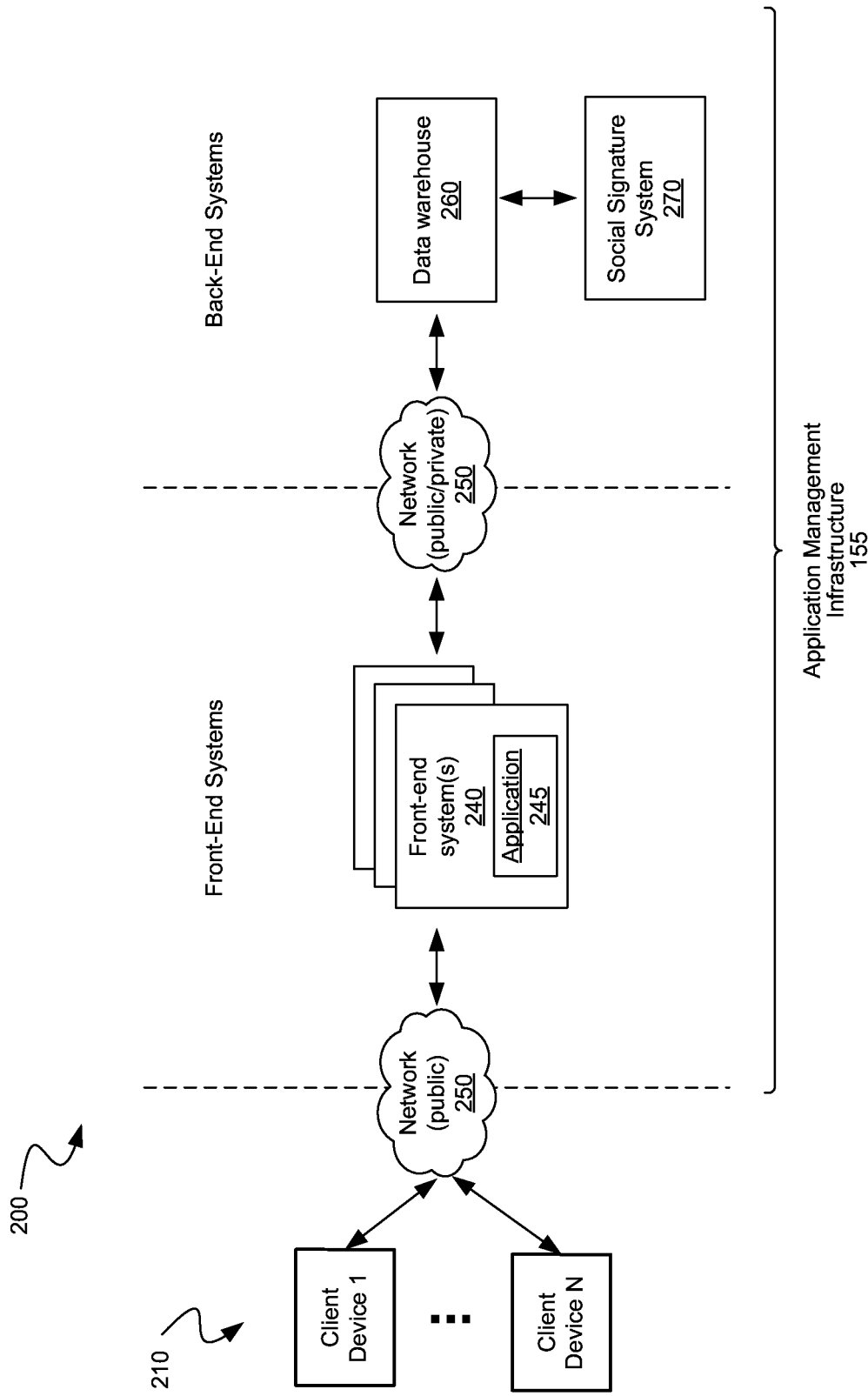
FIG. 2 is a block diagram illustrating a more detailed example of the application management infrastructure of FIG. 1.

FIG. 2 depicts a block diagram illustrating a more detailed example 200 of the application management infrastructure 155 of FIG. 1, consistent with various embodiments. The application management infrastructure 155 can include various front-end systems and back-end systems that can be physically and/or functionally distributed. As illustrated, the application management infrastructure 155 includes front-end systems, e.g., a front-end system 240, and back-end systems that includes, among others, a back-end data warehouse 260 and a social signature system 270. In some embodiments, the front-end systems and the back-end systems can collectively comprise the databases 135 and 140 and the access management system 150 of FIG. 1. The client devices or user devices 210 can be configured to communicate via the network 250 with the front-end system 240, the front-end system 240 can be configured to communicate with the client devices 210 and the back-end data warehouse 260 via the network 250, and the back-end data warehouse 260 can be configured to communicate with the front-end system 240 and the social signature system 270 via the network 250. In some embodiments, the client devices 210 are similar to the user devices 115 of FIG. 1.

The front-end system 240 can host an application 245, e.g., a social networking application, that can be accessed by end-users using their associated client devices 210. In some embodiments, a portion of the application 245 is installed on the client devices 210, e.g., as a mobile app. The front-end system 240 can comprise various operational systems, e.g., server computing devices, and/or relational databases. The operational systems are typically optimized for preservation of data integrity and speed of recording transactions through use of database normalization and an entity-relationship model. Fully normalized database designs often result in information being stored in hundreds or even thousands of tables. Relational databases are efficient at managing the relationships between these tables. The databases have very fast insert/update performance because only a small amount of data in those tables is affected each time a transaction is processed. For performance and other purpose, older data is periodically purged from the front-end system 240 to the data warehouse 260.

The data warehouse 260 is a "functionally" central repository for data that is purged from multiple front-end (operational) systems. The data warehouse 260 is "functionally" central because it can be physically and/or functionally distributed among various systems. For example, the data warehouse 260 can include a user space for server logs associated with end-user data that can be sharded, e.g., partitioned, across any number of physical distributed machines. In some embodiments, the back-end data warehouse 260 stores information regarding users, e.g., user profile data which includes one or more user properties, information regarding friends of the users, social signature of the users, content posted and/or shared between the users. The data warehouse 260 can store current as well as historical data. For example, the back-end data warehouse 260 can store historical user data that is ten years or older. The data warehouse 260 is commonly used for operational and development purposes including, but not limited to, data analysis.

The data warehouse 260 may take a variety of forms. In some embodiments, the data warehouse 260 is configured as a distributed file storage system, e.g., Hadoop distributed file storage (HDFS).

The social signature system 270 can comprise various processing systems that perform the various functions discussed herein, e.g., determining social similarities between at least a pair of users and determining whether a user is likely to be a spammer. The various component, functions, and or tools that can be associated with and/or included within the social signature system 270 are discussed in detail with reference to paragraphs below.

Figure 3:
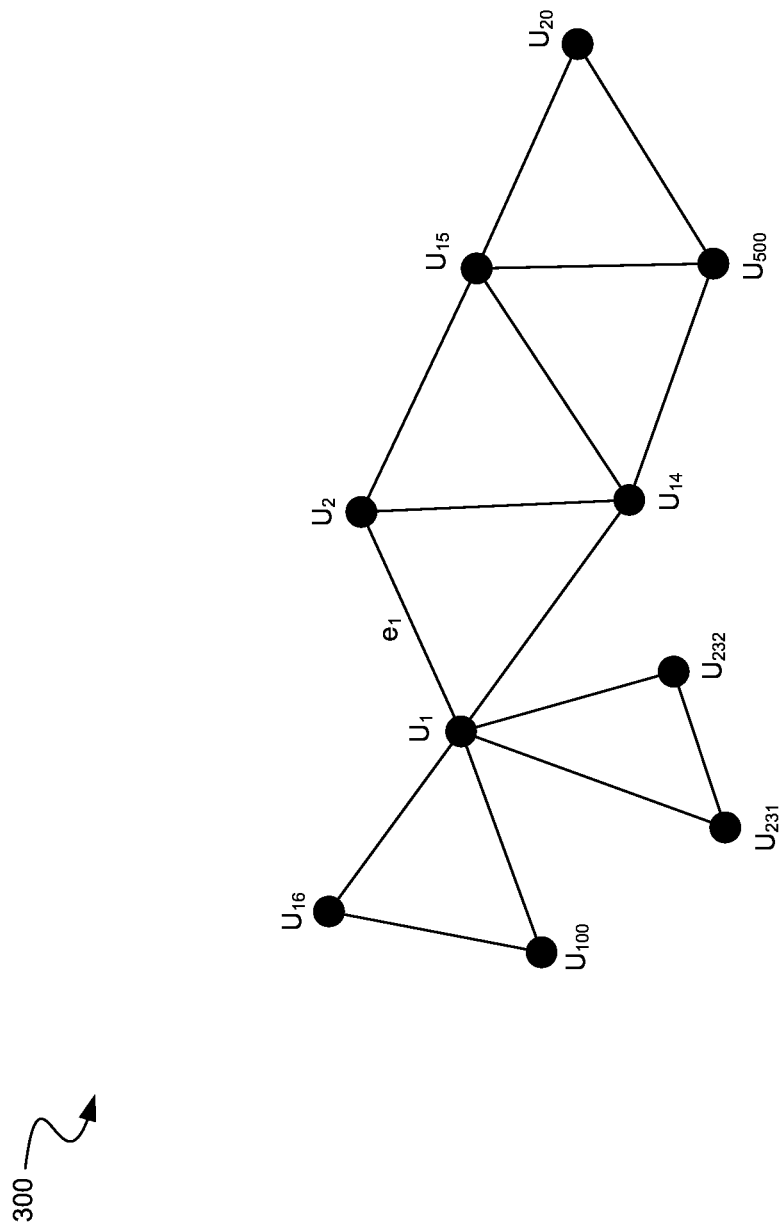
FIG. 3 is a graph of entities in an application, consistent with various embodiments.

FIG. 3 depicts a graph of entities in an application, consistent with various embodiments. The vertices and edges of the graph 300 depict the entities and connections between the entities in an application 245, e.g., social networking application. In some embodiments, the entities are users of the social networking application and the connections are a relationship between the users. For example, the vertices U1-U500 are the users of the application 245 and an edge, e.g., edge e1 between the vertices U1 and U2 depicts a relationship or an association between the users U1 and U2. The relationship can be based on various user properties, e.g., a gender of a user, an age of the user, a country of the user, a region of the user, a city of the user, a level of education of the user, or a life stage of the user. For example, the edge e1 can indicate that the users U1 and U2 went to the same school, college, are from the same hometown, are friends in the social networking application, or that U1 is a friend of a friend of U2.

In some embodiments, the graph 300 can be constructed using the user profile data of the users. The graph 300 can be stored in a storage system associated with the application 245, e.g., the data warehouse 260. The graph 300 can be generated using the social signature system 270.

Figure 4:
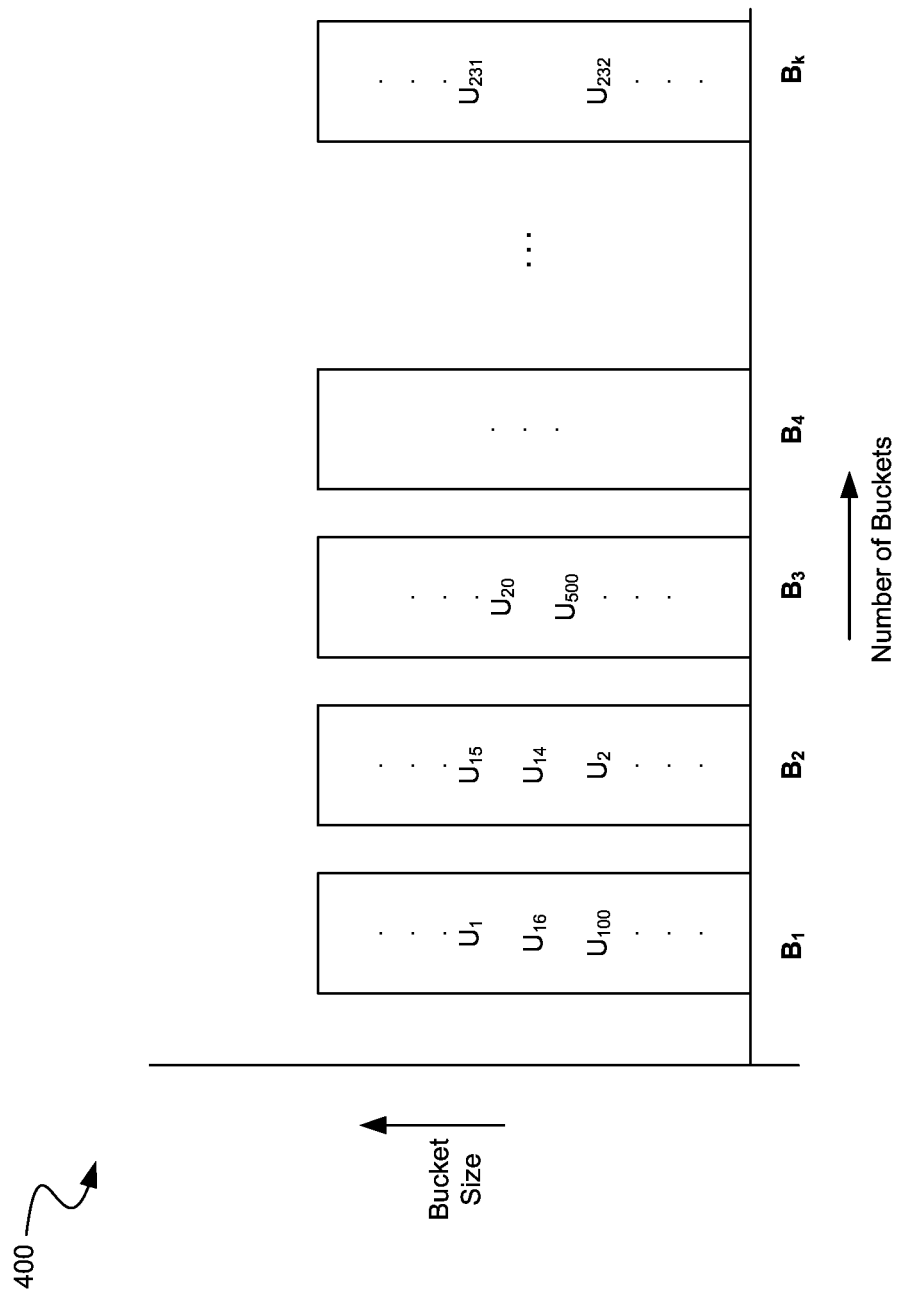
FIG. 4 is a block diagram illustrating clustering the users of the application into multiple buckets, consistent with various embodiments.

FIG. 4 is a block diagram illustrating clustering the users of the application into multiple buckets, consistent with various embodiments. The social signature system 270 clusters the users into multiple buckets based on their user properties as depicted in a cluster map 400. The social signature system 270 clusters each of the users into one of k buckets in which k is a specified number. The social signature system 270 can use various clustering methods for clustering the users to the buckets. For example, the social signature system 270 can use a spherical k-means algorithm or a variation thereof to cluster the users into k buckets. In some embodiments, k-means clustering is a method of vector quantization used for cluster analysis in data mining.

The k-means clustering aims to partition n observations into k clusters in which each observation belongs to the cluster with the nearest mean, serving as a prototype of the cluster. In some embodiments, the spherical k-means algorithm, which is a k-means algorithm with cosine similarity, is a popular method for clustering high-dimensional data. In this algorithm, each data as well as each cluster mean is represented as a high-dimensional unit-length vector. The clustering method uses the user properties of the users to determine to which bucket the user should be mapped. Regardless of the clustering method used, the social signature system 270, in assigning the users to k buckets, ensures that the clusters are of exactly the same size, that is all the buckets have equal or approximately equal number of users, and that most of the connections of the users assigned to a single bucket stay within the single bucket and the connections of the users between buckets is minimized. For example, the clustering method can take the graph 300, partition the graph 300 into k buckets such that each of these k buckets are of the same size and most of the edges of the vertices in a specified bucket are fully contained within the specified bucket, and the edges across different buckets are minimized. As a result of the above clustering method, the social signature system 270 assigns each of the users to one of k buckets such that users with similar social properties are assigned to the same bucket. For example, as indicated in the cluster map 400, a user with user identification "U1" is assigned to bucket $B_1$ and user "U20" is assigned to bucket $B_3$.

In some embodiments, the number k is chosen according to the required granularity in clustering the users, or is based on the number of users to be clustered. For example, consider that k is "21000" and the number of users in the application is 2 billion, each one of the buckets will have about "100,000" users. If the clustering method ensures that the users are assigned to the buckets such that most of the edges of a set of vertices corresponding to a set of users assigned to a specified bucket are within the specified bucket and do not cross the buckets, the users categorized/assigned to a specified bucket can form a well-connected set of users, e.g., small communities of users such as users within the same neighborhood or a town. The higher the k the more well-connected can be the users categorized to the bucket and the clustering method groups together people who are similar to each other in a narrowed way.

Figure 5:
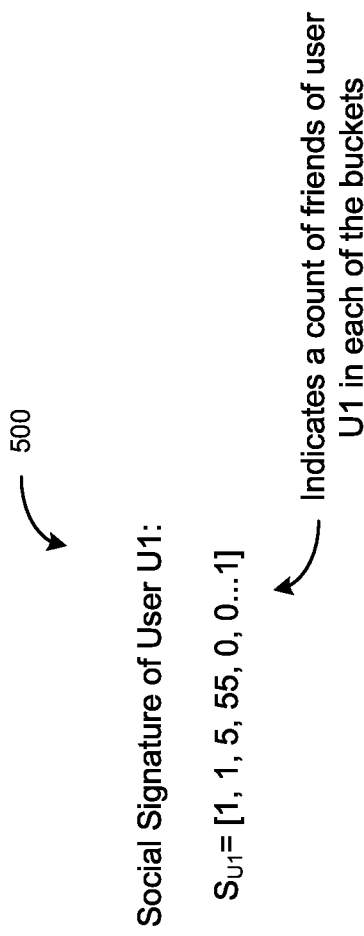
FIG. 5 depicts a social signature of a user, consistent with various embodiments.

FIG. 5 depicts a social signature of a user, consistent with various embodiments. The social signature system 270 determines a social signature of a specified user as a vector of k elements in which each of the k elements indicates a count of the users associated with the specified user, e.g., friends of the specified user in the application 245, assigned to a bucket corresponding to the element. For example, a social signature 500 of the user U1 is represented as $S_{U1}=[1, 1, 5, 55, 0, 0 \ldots 1]$. The social signature 500 indicates that one friend of the user U1 is assigned to bucket $B_1$, another one to bucket $B_2$, five of them to bucket $B_3$, fifty five of them to bucket $B_4$, and so on. The social signature 500 indicates a distribution of the friends of the user U1 across the buckets.

The social signature system 270 can use the social signature for a variety of purposes. For example, the social signature system 270 can use the social signature to determine a social similarity between a pair of users in the application. In another example, the social signature system 270 can use the social signature to determine whether a specified user is likely to be a spammer. In yet another example, the social signature system 270 can use the social signature to recommend a friend to the user.

Figure 6:
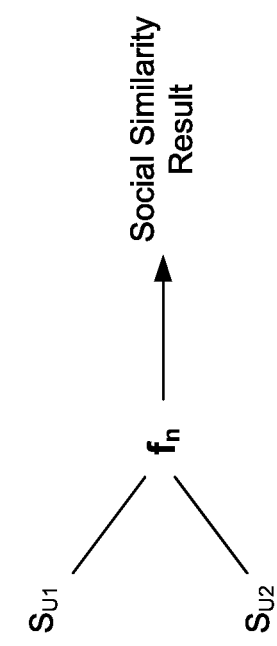
FIG. 6 is an example for determining a similarity between a pair of entities in the application, consistent with various embodiments.

FIG. 6 depicts an example for determining a similarity between a pair of entities in the application, consistent with various embodiments. In some embodiments, the example 600 can be used for determining a social similarity between a pair of users in the application 245. The social signature system 270 can determine a social similarity between a pair of users by comparing the social signature of the pair of users, as illustrated in the example 600. For example, the social signature system 270 can determine the social similarity of users U1 and U2 by comparing the social signatures 500 and 605 of the users U1 and U2, respectively. The social signature system 270 can use various comparing functions, e.g., comparing function 610, to compare the social signatures of the users. For example, the comparing function 610 can be a cosine similarity function. In some embodiments, the cosine similarity function is a measure of similarity between two vectors of an inner product space that measures the cosine of the angle between them. The cosine of 0° is 1, and it is less than 1 for any other angle. It is thus a judgment of orientation and not magnitude: two vectors with the same orientation have a cosine similarity of 1, two vectors at 90° have a similarity of 0, and two vectors diametrically opposed have a similarity of −1, independent of their magnitude. Cosine similarity is particularly used in positive space, where the outcome is neatly bounded in [0,1]. The social signature system 270 applies a cosine function on the social signatures a result of which indicates a social similarity between the users U1 and U2. The result of the cosine similarity function is typically a value that is within a range, e.g., "0" to "1," in which a value closer to "1" indicates a high degree of social similarity between the pair of users and a value closer to "0" indicates a low degree of social similarity between the pair of users.

Figure 7:
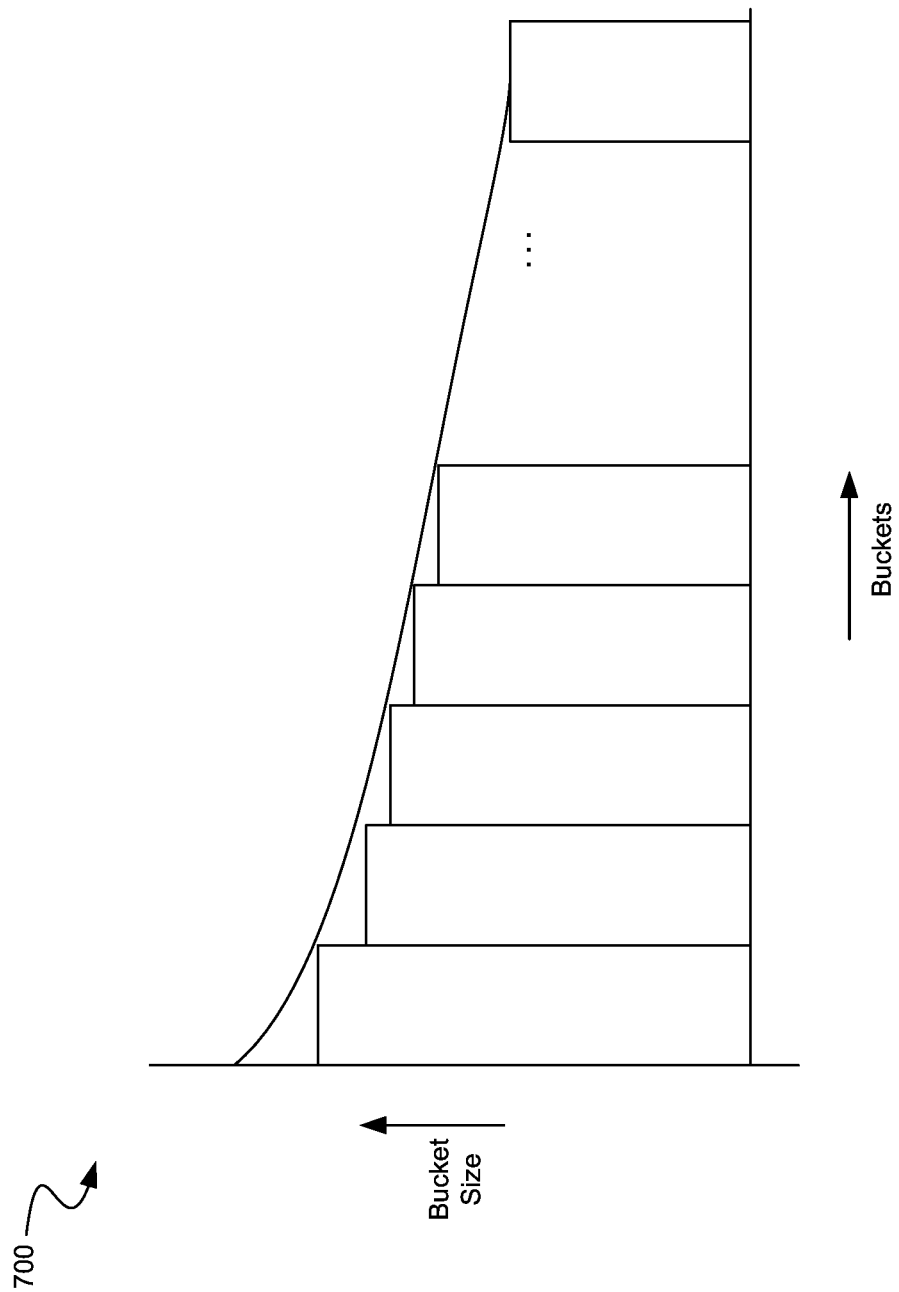
FIG. 7 is a sorted graph of a distribution of entities associated with a specified entity of the application that is used to determine an anomaly with respect to the specified entity, consistent with various embodiments.

FIG. 7 depicts a sorted graph of a distribution of entities associated with a specified entity of an application that is used to determine an anomaly with respect to the specified entity, consistent with various embodiments. In some embodiments, the sorted graph 700 can be a distribution of users associated with a specified user of the application 245, and can be used to determine whether specified user is a spammer. The social signature system 270 can determine if the specified user is a spammer using the social signature of the specified user. In some embodiments, the social signature system 270 identifies the buckets to which the friends of the specified user are assigned, and sorts the buckets based on a sorting function, e.g., based on the number of friends in each of the buckets, to generate the sorted graph 700. If the sorted graph 700 is of a specified pattern, e.g., a pattern that is typical of a spammer, the specified user is determined as likely to be a spammer.

In some embodiments, a spammer is a person who typically attempts to be friends with many users and any random user of the social networking application regardless of whether the random user is connected to the spammer in real life. Since the spammer tries to connect with many random users, there is high likelihood that the friends of spammer are distributed across more buckets than what is typical for a non-spammer user. For a non-spamming user, the distribution of friends may be across a limited number of buckets, e.g., friends from work can be one bucket, friends from hometown can be one bucket, and family can be one bucket. So, the sorted graph for a non-spammer user who has friends in a limited number of buckets can be different from a spammer user who has friends in a large number of buckets (e.g., a number that exceeds a specified threshold. The specified threshold can be determined based on analyzing the number of buckets various non-spammer users typically have.). Accordingly, if the sorted graph 700 is of a pattern that matches with that of a spammer user (can also be compared with the pattern of the sorted graph of known spammers), the social signature system 270 determines the specified user as likely to be a spammer.

Figure 8:
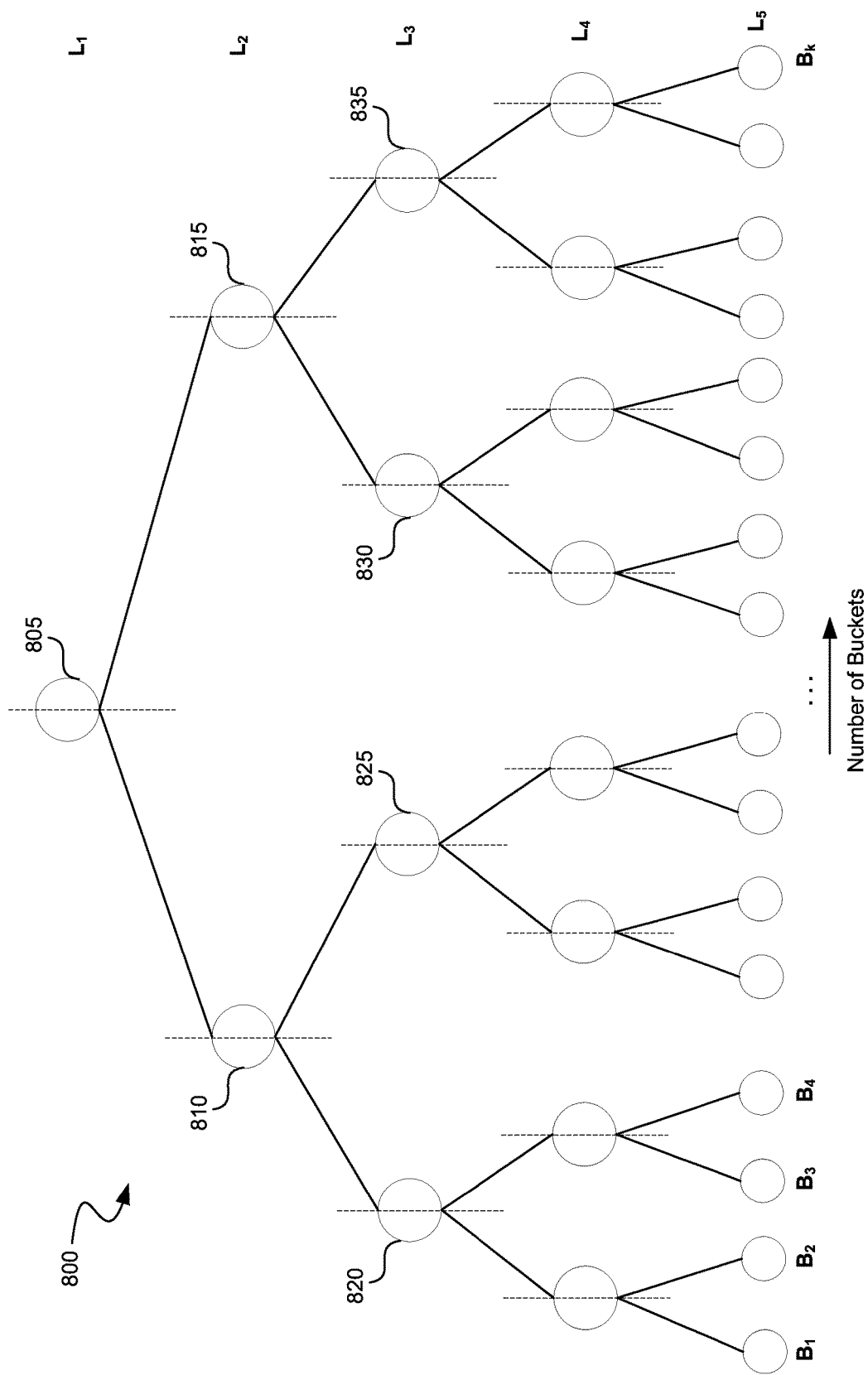
FIG. 8 is a block diagram for clustering the users of the application into multiple buckets, consistent with various embodiments.

FIG. 8 is a block diagram for clustering the users of the application into multiple buckets, consistent with various embodiments. The social signature system 270 can use a second clustering method to cluster the users into multiple buckets, e.g., nodes of a tree data structure 800, based on their user properties as depicted in FIG. 8. The second clustering method can map the users to the buckets by recursively partitioning a graph depicting entities and connections between the entities, e.g., the graph 300 of FIG. 3, into number of partitions until a specified number of buckets, e.g., k buckets, are formed at a leaf level of the tree data structure 800. Each of the users is assigned to one of the buckets at the leaf level of the tree data structure 800.

For example, consider that the node 805 depicts the graph 300. The second clustering method partitions the graph 300 into a number of partitions, e.g., 2 partitions, resulting in generation of node 810 and node 815 at a second hierarchical level L2 of the tree data structure 800. Some of the users are mapped to node 810 and some to node 815. The nodes 810 and 815 form the child nodes of node 805. The second clustering method then further partitions the nodes 810 and 815 into two partitions each resulting in generation of four nodes 820-835 at a third hierarchical level L3 of the tree data structure 800. The nodes 820 and 825 form the child nodes of node 810 and the nodes 830 and 835 form the child nodes of node 815. Some of the users from the node 810 are mapped to node 820 and remaining to node 825. Similarly, some of the users from the node 815 are mapped to node 830 and remaining to node 835. The second clustering method continues partitioning as described above until k buckets or nodes are formed in the leaf level of the tree data structure 800. For example, if k=2, the second clustering method stops after splitting the node 805 into nodes 810 and 815 at L2, and the users are assigned to the bucket (node) 810 or bucket (node) 815. However, if k is greater than 2, e.g., 6, the second clustering method continues to partition the nodes in hierarchical level L2 to generate the nodes at hierarchical level L3.

In some embodiments, the second clustering method is based on balanced graph partitioning algorithm or a variation thereof. In some embodiments, for a graph G=(V, E), where V denotes the set of n vertices and E the set of edges and for a (k, v) balanced partition problem, the objective of a balanced graph partitioning problem is to partition G into k buckets of at most size v·(n/k), while minimizing the capacity of the edges between separate buckets. Also, given G and an integer k>1, the method partitions V into k parts (subsets) $V_1, V_2, \ldots, V_k$ such that the parts are disjoint and have equal size, and the number of edges with endpoints in different parts is minimized.

Regardless of the type of second clustering method used, in mapping the users to the buckets, the social signature system 270 can ensure that the buckets are of exactly the same size, that is all the buckets have equal number of users, and that most of the connections of the users assigned to a single bucket stay within the single bucket and that the connections of the users between buckets are minimized.

After the second clustering method completes successfully, each of the users are assigned to one of k buckets at the leaf level. For example, as indicated in the tree data structure 800, a user with user identification "U1" is assigned to bucket $B_1$ and user "U20" is assigned to bucket $B_3$.

Figure 9:
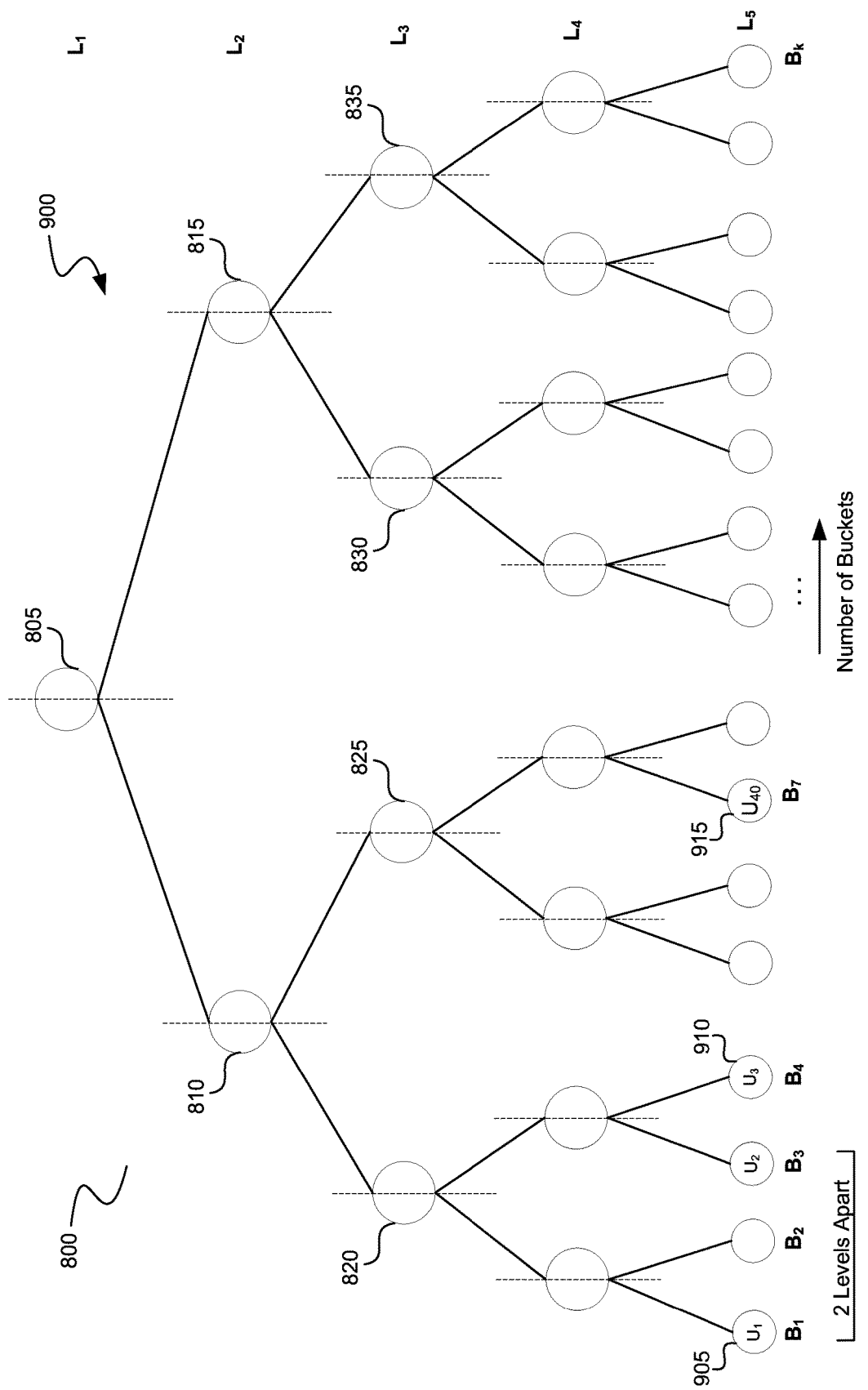
FIG. 9 is a block diagram for determining a similarity between a pair of entities in the application, consistent with various embodiments.

FIG. 9 is a block diagram for determining a similarity between a pair of entities in the application, consistent with various embodiments. In some embodiments, the social signature system 270 can be used for determining a social similarity between a pair of users in the application 245 as depicted in the example 900. The social signature system 270 can determine the social similarity of the pair of users based on a hierarchical distance between the leaf level and a nearest parent node that is common to the leaf level nodes to which the pair of users is assigned. The nearer the common parent node is to the leaf level of the tree data structure 800 the more similar the pair of users are.

For example, consider that the user "U1" is assigned to bucket B1, the user "U3" is assigned to bucket B4, and the user "U40" is assigned to bucket $B_7$. The social signature system 270 can determine the social similarity of users U1 and U3 by determining a nearest parent node that is common to the leaf level nodes 905 and 910 to which the users U1 and U3 are assigned. The social signature system 270 determines that the nearest common parent to the nodes 905 and 910 is node 820 and that the common parent node 820 is two hierarchical levels apart from the leaf level L5. The social similarity for users U1 and U3 is determined as two units. Similarly, for the users U1 and U40, the social signature system 270 determines the nearest common parent to the nodes 905 and 915, which is node 810, is three hierarchical levels apart from the leaf level L5. The social similarity for users U1 and U40 is determined as three units. In some embodiments, the nearer the common parent node is to the leaf level of the tree, e.g., lesser the distance between them, the more similar the two users are.

Additionally or alternatively, the social signature system 270 can determine the social similarity between a pair of users by using their social signature, e.g., as described at least with reference to FIG. 6. As described above, the social signature can be determined as a vector that is k elements wide in which k is the number of buckets and indicates a count of friends of the user assigned to the corresponding bucket. Here, the social signature system 270 determines the social signature 500 of the user U1 by identifying the buckets in the leaf level L5 of the tree data structure 800 to which the friends of the user U1 are assigned, and similarly, for the user U2 by identifying the buckets to which the friends of the user U2 are assigned. The social signature system 270 can determine the social similarity of the users U1 and U2 by comparing the social signatures 500 and 605 of the users U1 and U2 using the comparing function 610.

The comparing function 610 can be an earthmover's distance function. In some embodiments, the earth mover's distance (EMD) is a measure of the distance between two probability distributions over a region D. Informally, if the distributions are interpreted as two different ways of piling up a certain amount of dirt over the region D, the EMD is the minimum cost of turning one pile into the other; where the cost is assumed to be the amount of dirt moved times the distance by which it is moved.

The comparing function 610 can determine the distance either of the distributions of friends, e.g., represented by social signatures of users U1 and U2, have to be moved to make the distributions identical. The distance between the two distributions can indicate how similar the pair of users is. In some embodiments, the larger the distance between the distributions the lesser is the social similarity between the pair of users.

Figure 10:
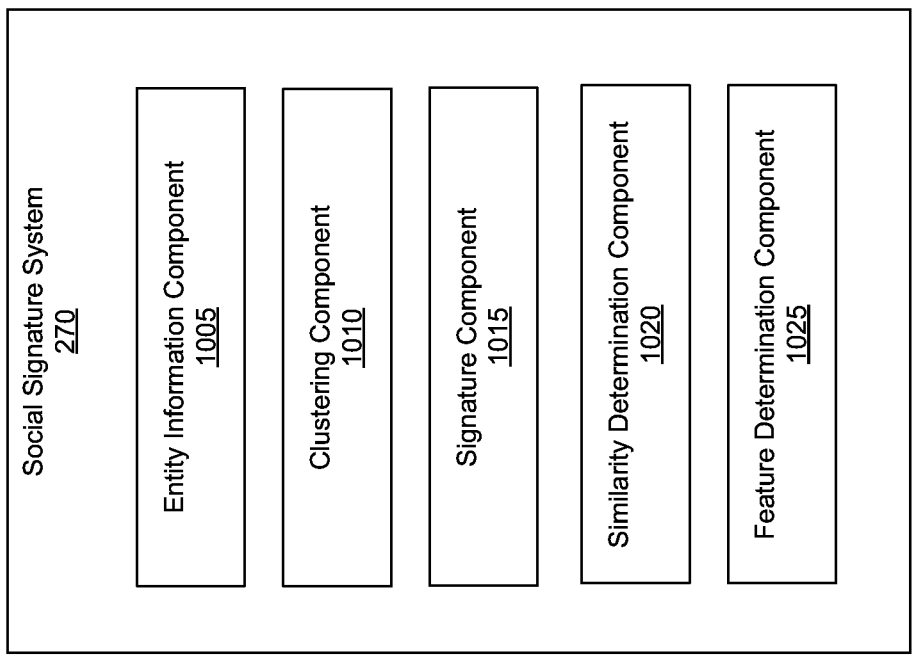
FIG. 10 is a block diagram of the social signature system of FIG. 2, consistent with various embodiments.

FIG. 10 is a block diagram of the social signature system of FIG. 2, consistent with various embodiments. The social signature system 270 includes various components that are configured to perform the disclosed embodiments. The social signature system 270 includes an entity information component 1005 that is configured to receive information regarding entities. For example, the entity information component 1005 can receive user information such as the graph 300 of FIG. 3. In another example, the entity information component 1005 can retrieve the user information, e.g., user properties, from the storage system associated with the application 245, e.g., data warehouse 260 and generate the graph 300.

The social signature system 270 includes a clustering component 1010 that is configured to cluster, categorize, map or assign entities to clusters or buckets. For example, the clustering component 1010 can categorize the users of the application 245 to various buckets based on their user properties. The clustering component 1010 can use one or more clustering algorithms, e.g., spherical k-means and balanced graph partitioning, to categorize the users among various buckets.

The social signature system 270 includes a signature component 1015 that is configured to determine a signature of an entity based on the clustering information. For example, the signature component can be configured to determine a social signature of a user of the application 245 based on information regarding how the user's friends are categorized to various buckets.

The social signature system 270 includes a similarity determination component 1020 that is configured to determine a similarity between a pair of entities of an application. For example, the similarity determination component 1020 is configured to determine a social similarity between a pair of users of the application 245. In some embodiments, the similarity determination component 1020 is configured to determine the social similarity by comparing the social signatures of the pair of users using a comparing function, e.g., earth mover's distance function and cosine similarity function.

The social signature system 270 includes a feature determination component 1025 that is configured to determine various features associated with or that describe a specified entity of the application. For example, the feature determination component 1025 can be configured to determine if a specified user of the application 245 is a spammer based on the social signature of the specified user. Additional details with respect to the above components of the social signature system 270 are described at least with reference to FIGS. 11-14 below.

Note that the social signature system 270 is not restricted to the above components, it can include lesser number of components, e.g., functionalities of two components can be combined into one component, or can include more number of components, e.g., components that perform other functionalities or functionalities of a component can be split into two or more components. Further, in some embodiments, the social signature system 270 can be implemented as a distributed system, e.g., the components of the social signature system 270 can be distributed across multiple physical computers.

Figure 11:
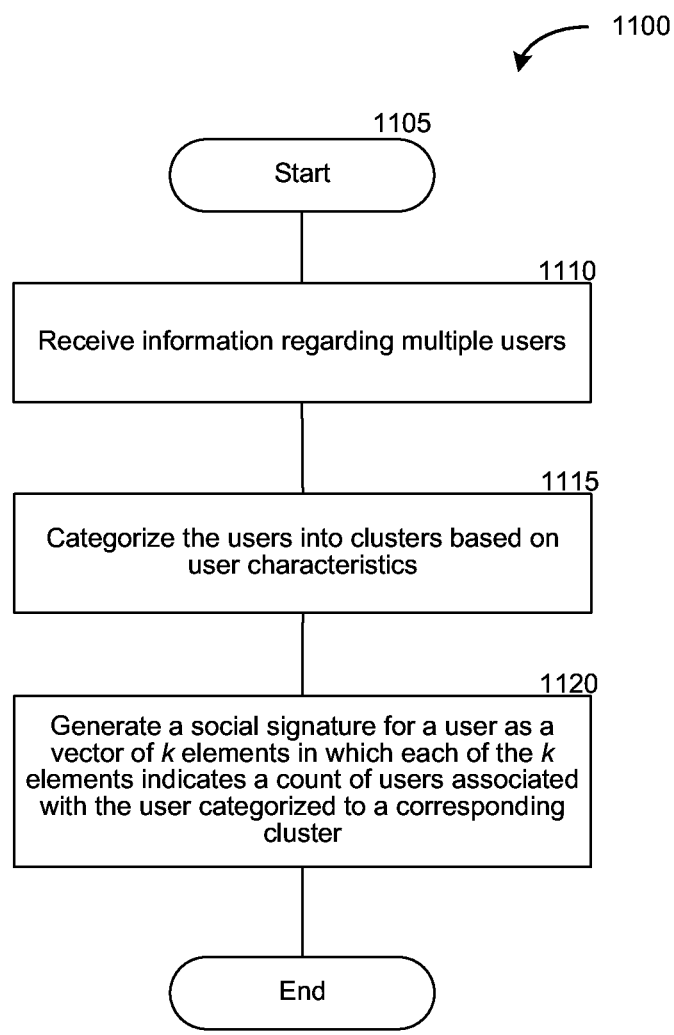
FIG. 11 is a flow diagram of a process of generating a signature for an entity, consistent with various embodiments.

FIG. 11 is a flow diagram of a process 1100 of generating a signature for an entity, consistent with various embodiments. In some embodiments, the process 1100 may be implemented in the environment 100 of FIG. 1. In some embodiments, the entity is a user of the application 245 and the signature is a social signature of the user, e.g., social signature 500 of the user U1. The process 1100 begins at block 1105, and at block 1110, the entity information component 1005 receives information regarding users of the application 245. The information can be a user profile of the users having one or more user properties. The information can also include information regarding a set of users associated with each of the users, e.g., friends of each of the users in the application 245. In some embodiments, the entity information component 1005 receives the information as a graph, e.g., the graph 300, which depicts the users and connections between the users.

At block 1115, the clustering component 1010 categorizes the users into various clusters or buckets based on user properties of the users. The clustering component 1010 categorizes each of the users into one of k buckets, e.g., as described at least with reference to FIGS. 4 and 8. The clustering component 1010 can use one or more clustering algorithms, e.g., spherical-k means and balanced graph partitioning methods or a variation thereof, for categorizing the users to buckets.

At block 1120, the signature component 1015 generates a social signature for one or more users, e.g., as described at least with reference to FIG. 5. In some embodiments, the social signature 500 for the user U1 is generated based on a distribution of the friends of the user U1 across the buckets. For example, the social signature can be a vector of k elements in which each of the k elements indicates a count of the friends of a specified user in the application 245 assigned to a bucket corresponding to the element. For example, a social signature 500 of the user U1 is represented as $S_{U1}$=[1, 1, 5, 55, 0, 0 . . . 1]. The social signature 500 indicates that one friend of the user U1 is assigned to bucket $B_1$, another one to bucket $B_2$, five of them to bucket $B_3$, fifty five of them to bucket $B_4$, and so on.

Figure 12:
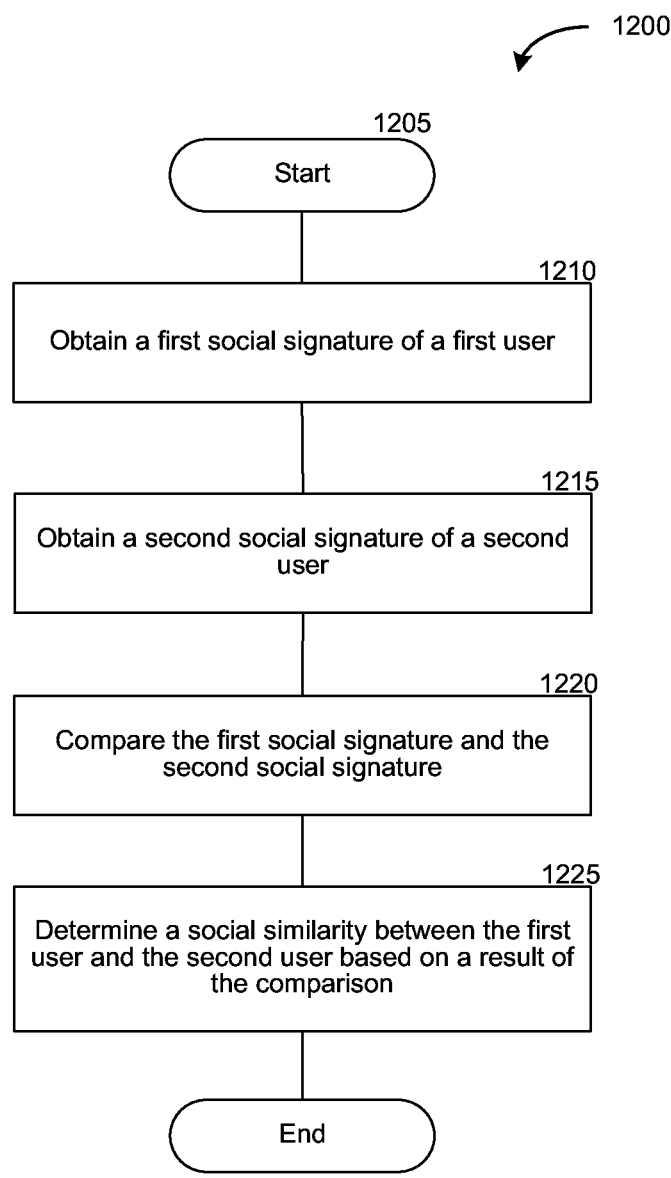
FIG. 12 is a flow diagram of a process of determining a similarity between a pair of entities of an application, consistent with various embodiments.

FIG. 12 is a flow diagram of a process 1200 of determining a similarity between a pair of entities of an application, consistent with various embodiments. In some embodiments, the process 1200 is implemented in the environment 100 of FIG. 1. The process 1200 can be used to determine a social similarity between a pair of users of the application 245. The process 1200 begins at block 1205, and at block 1210, the similarity determination component 1020 obtains a first social signature 500 of a first user U1 from the signature component 1015 or the data warehouse 260.

At block 1215, the similarity determination component 1020 obtains a second social signature 605 of a second user U2 from the signature component 1015 or the data warehouse 260.

At block 1220, the similarity determination component 1020 compares the first social signature 500 and the second social signature 605 using a comparison function to determine the social similarity between the first user U1 and the second user U2, e.g., as described at least with reference to FIG. 6. The comparison function generates a value that indicates the social similarity between the users U1 and U2. For example, the comparison function can be a cosine similarity function or earth mover's distance function.

At block 1225, the similarity determination component 1020 determines the social similarity between the users U1 and U2 based on a result of the comparison. In some embodiments, the result of the comparison can be a value that is within a range, e.g., 0 to 1. A value closer to 0 can indicate that the two users are less likely to be socially similar, or have a low degree of social similarity, while a value closer to 1 can indicate that the two users are more likely to be socially similar, or have a high degree of social similarity. The social similarity can indicate a degree of similarity, or is a measure of how socially similar are the users U1 and U2 regardless of whether they are friends, connected to and/or associated with each other in the application 245. For example, if the users U1 and U2 are having a high degree of social similarity, it can be because the pair of users are from the same hometown, same age, did same type of work, went to same school or college, or have one or more common friends. In some embodiments, the users U1 and U2 may be categorized to the same bucket or different buckets during the clustering described in the process 1100 of FIG. 11.

Figure 13:
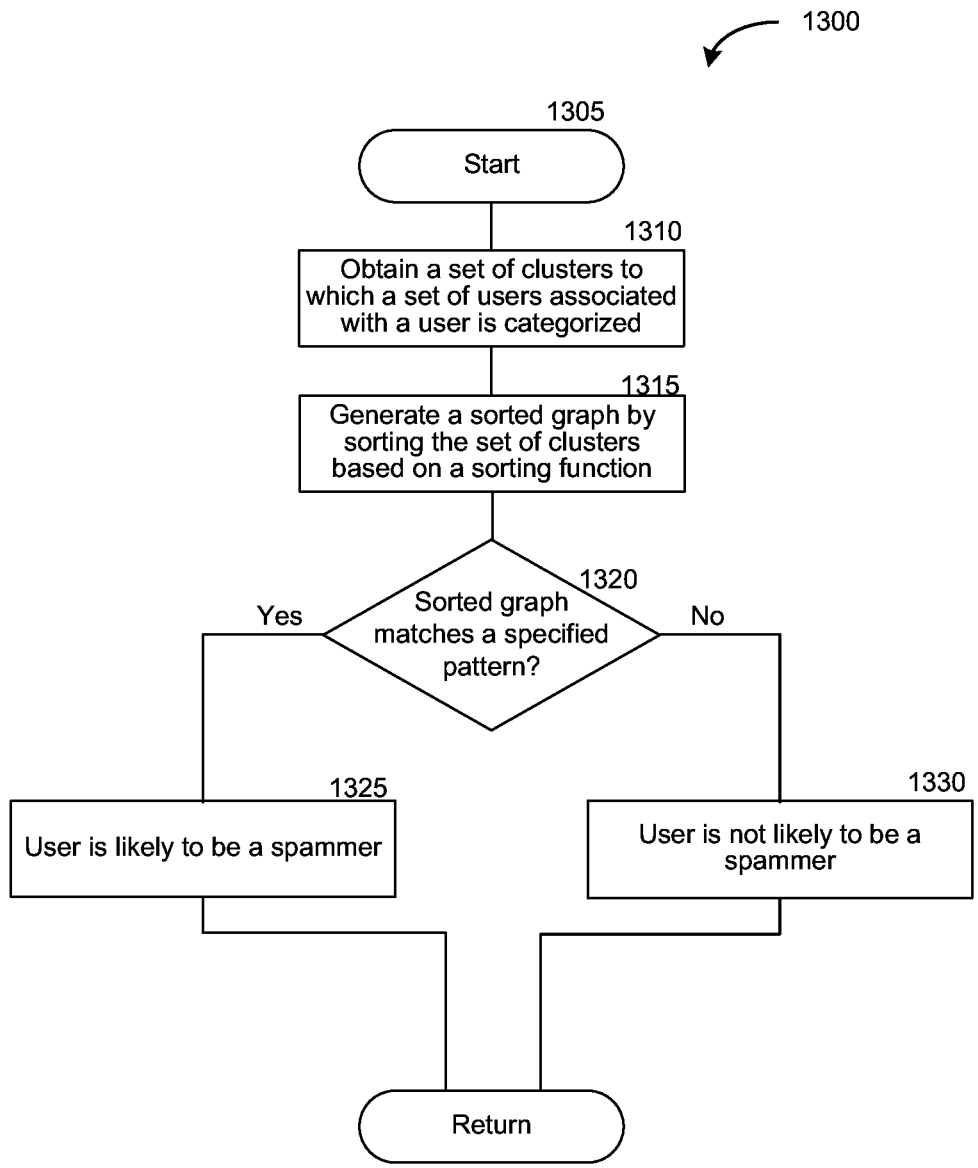
FIG. 13 is a flow diagram of a process of determining a feature that describes or indicates a type of an entity of an application, consistent with various embodiments.

FIG. 13 is a flow diagram of a process 1300 of determining a feature that describes or indicates a type of an entity of an application, consistent with various embodiments. In some embodiments, the process 1300 may be implemented in the environment 100 of FIG. 1. The process 1300 can be used to determine whether a user of the application 245 is likely to be a spammer. The process 1300 begins at block 1305, and at block 1310, the feature determination component 1025 obtains a set of buckets to which a set of users associated with a specified user, e.g., friends of the specified user, are assigned. The feature determination component 1025 can obtain the set of buckets by obtaining a social signature of the specified user.

At block 1315, the feature determination component 1025 sorts the buckets using a sorting function to generate a sorted graph of the set of buckets. The sorting function can be based on a count of the users assigned to each of the set of buckets. For example, the buckets can be sorted in an ascending order or descending order of the count of the users in each of the set of buckets.

At block 1320, the feature determination component 1025 determines whether the sorted graph matches a specified pattern, e.g., a pattern of the sorted graph of users known to be a spammer.

If the sorted graph matches the specified pattern, at block 1325, the feature determination component 1025 determines that the user is likely to be a spammer. On the other hand, if the sorted graph does not match the specified pattern, at block 1330, the feature determination component 1025 determines that the user is not likely to be a spammer.

Figure 14:
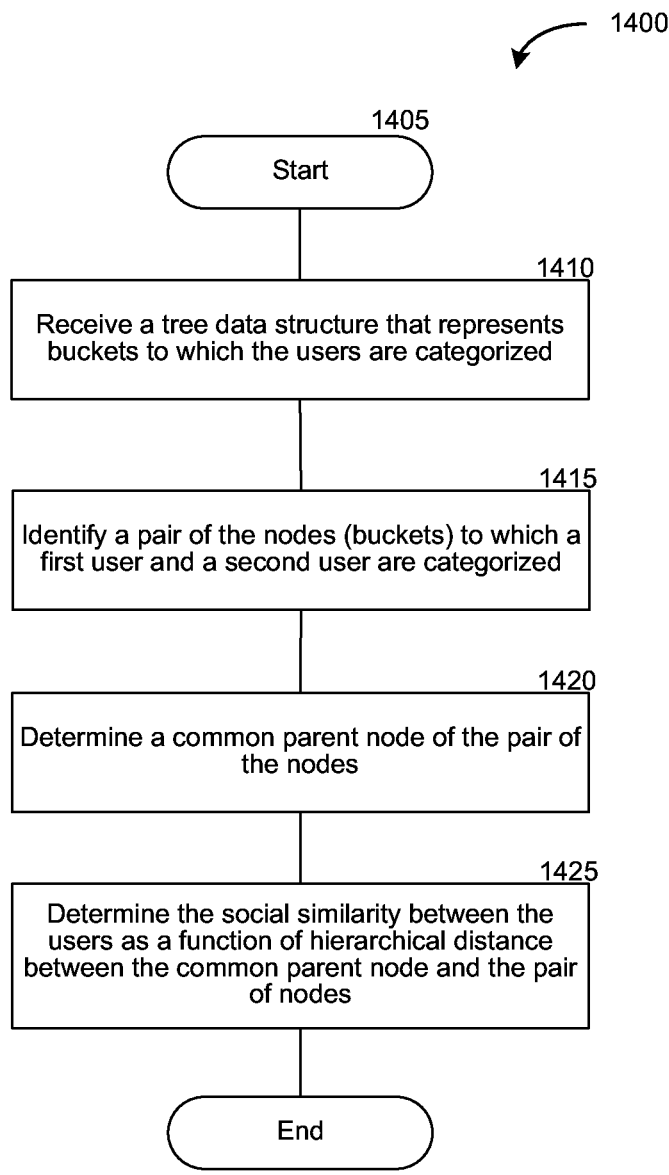
FIG. 14 is a flow diagram of a process of determining a similarity between a pair of entities of an application, consistent with various embodiments.

FIG. 14 is a flow diagram of a process 1400 of determining a similarity between a pair of entities of an application, consistent with various embodiments. In some embodiments, the process 1400 is implemented in the environment 100 of FIG. 1. The process 1200 can be used to determine a social similarity between a pair of users of the application 245, e.g., as described at least with reference to FIG. 9. The process 1400 begins at block 1405, and at block 1410, the similarity determination component 1020 receives a tree data structure, e.g., the tree data structure 800, that represents the buckets to which the users of the application 245 are categorized, e.g., based on clustering algorithm described at least with respect to FIG. 8.

At block 1415, the similarity determination component 1020 identifies the nodes to which a first user and the second user of the pair of users are assigned. In some embodiments, the users are assigned to the nodes in the leaf level of the tree data structure 800.

At block 1420, the similarity determination component 1020 determines a lowest or closest common parent node of the pair of the nodes. In some embodiments, the lowest or the closest common parent node is a common parent node for the pair of nodes that is closest to the leaf level of the tree data structure 800.

At block 1425, the similarity determination component 1020 determines the social similarity of the pair users as a function of the hierarchical distance between the common parent node and the pair of nodes. In some embodiments, the nearer the common parent node is to the leaf level of the tree data structure 800, the more socially similar the pair of users are likely to be.

Figure 15:
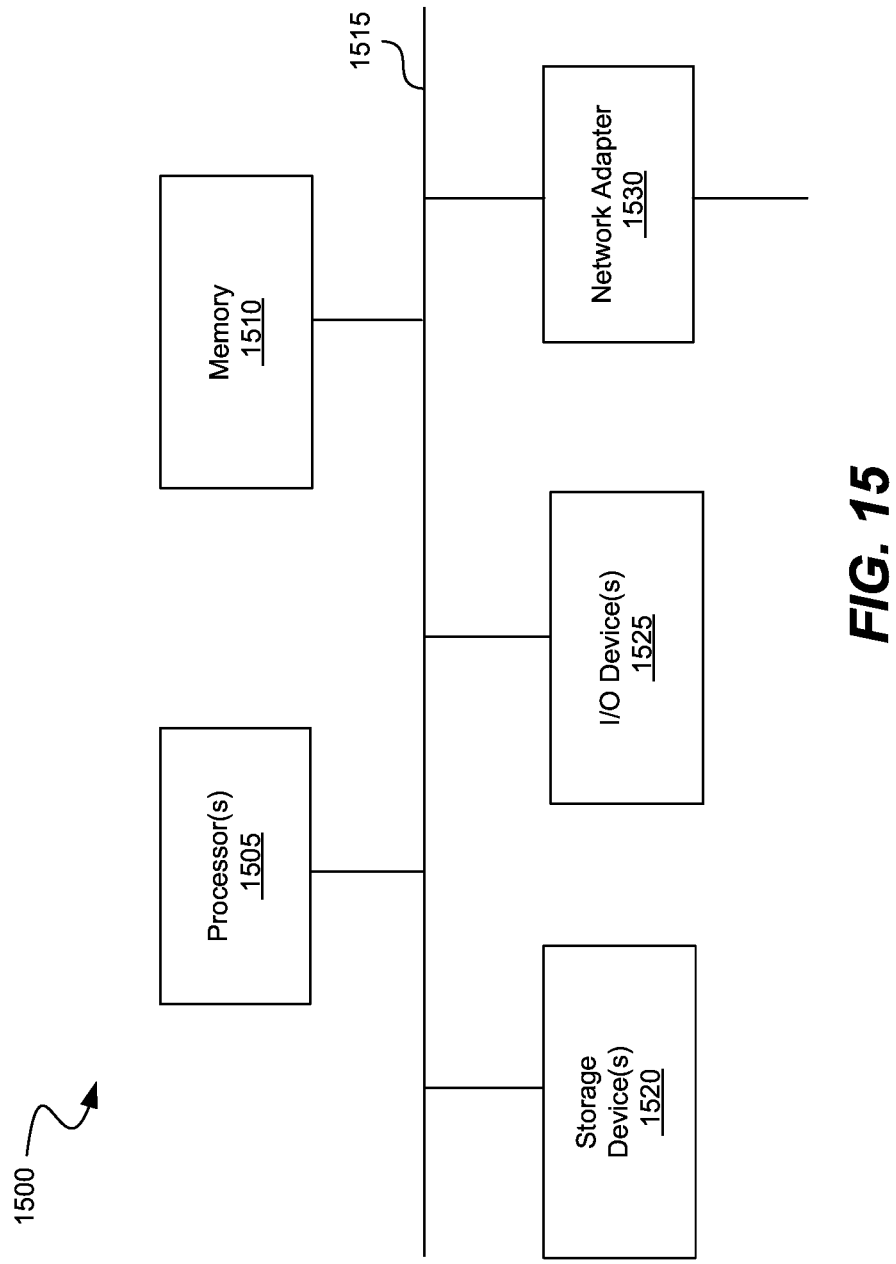
FIG. 15 is a block diagram of a processing system that can implement operations, consistent with various embodiments.

FIG. 15 is a block diagram of a computer system as may be used to implement features of the disclosed embodiments. The computing system 1500 may be used to implement any of the entities, components or services depicted in the examples of the foregoing figures (and any other components and/or modules described in this specification). The computing system 1500 may include one or more central processing units ("processors") 1505, memory 1510, input/output devices 1525 (e.g., keyboard and pointing devices, display devices), storage devices 1520 (e.g., disk drives), and network adapters 1530 (e.g., network interfaces) that are connected to an interconnect 1515. The interconnect 1515 is illustrated as an abstraction that represents any one or more separate physical buses, point to point connections, or both connected by appropriate bridges, adapters, or controllers. The interconnect 1515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1510 and storage devices 1520 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media).

The instructions stored in memory 1510 can be implemented as software and/or firmware to program the processor(s) 1505 to carry out actions described above. In some embodiments, such software or firmware may be initially provided to the processing system 1500 by downloading it from a remote system through the computing system 1500 (e.g., via network adapter 1530).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
receiving, at a computing system, information regarding multiple users, each of the users having one or more user characteristics that identify the corresponding user;
categorizing, by the computing system, the multiple users into a specified number of clusters, wherein each of the multiple users is assigned to one respective cluster of the specified number of clusters based on the user characteristics of the corresponding user;
determining, by the computing system, a set of connected users of the multiple users, each of the set of connected users being connected to a first user via a social networking platform;
determining, by the computing system, a set of connected clusters of the specified number of clusters, each of the set of connected clusters having assigned to it a respective connected user of the set of connected users; and
generating, by the computing system, a first social signature for the first user, wherein the first social signature is a vector of multiple elements, each of the multiple elements corresponding to a connected cluster of the set of connected clusters and indicating a quantity of connected users of the set of connected users assigned to a respective connected cluster.

2. The computer-implemented method of claim 1, wherein:
the first user is a member of a social networking application and the set of connected users is friends of the first user in the social networking application; and
the computing system comprises a social networking application.

3. The computer-implemented method of claim 1, further comprising:
determining a second social signature for a second user of the multiple users;
comparing the second social signature with the first social signature; and
determining a social similarity between the first user and the second user based on a result of the comparing.

4. The computer-implemented method of claim 3, wherein the comparing is performed based on a cosine similarity between the first social signature and the second social signature.

5. The computer-implemented method of claim 3, wherein the result indicates a degree of social similarity between the first user and the second user.

6. The computer-implemented method of claim 5, wherein the result ranges from a first value to a second value, and wherein the closer the result to the second value higher is the degree of the social similarity between the first user and the second user.

7. The computer-implemented method of claim 1, further comprising:
sorting the set of the connected clusters based on the quantity to generate a sorted graph; and
determining whether the first user is a spammer based on the sorted graph.

8. The computer-implemented method of claim 7, wherein determining whether the first user is a spammer includes determining that the first user is a spammer in an event the sorted graph is of a specified pattern.

9. The computer-implemented method of claim 7, wherein the first user is likely to be a spammer if the set of connected users is spread across a number of clusters greater than a specified threshold.

10. The computer-implemented method of claim 1, wherein the one or more user characteristics includes at least one of a gender of the user, an age of the user, a country of the user, a region of the user, a city of the user, a level of education of the user, or a life stage of the user.

11. The computer-implemented method of claim 1, wherein the categorizing is performed using a spherical-k means clustering algorithm.

12. The computer-implemented method of claim 1, wherein the categorizing is performed using a balanced graph partitioning algorithm.

13. A non-transitory computer-readable storage medium storing computer-readable instructions, comprising:
  instructions for receiving information regarding multiple users, each of the users having one or more user characteristics that identify the corresponding user;
  instructions for categorizing the multiple users into a specified number of clusters, wherein each of the multiple users is assigned to one respective cluster of the specified number of clusters based on the user characteristics of the corresponding user;
  instructions for determining a set of connected users of the multiple users, each connected user of the set of connected users being connected to a first user via a social networking platform;
  instructions for determining a set of connected clusters of the specified number of clusters, each of the set of connected clusters having assigned to it a respective connected user of the set of connected users;
  generating, by a computing system, a first social signature for the first user, wherein the first social signature is a vector of multiple elements, each of the multiple elements corresponding to a connected cluster of the set of connected clusters and indicating a quantity of connected users of the set of connected users assigned to a respective connected cluster;
  instructions for comparing the first social signature with a second social signature for a second user of the multiple users; and
  instructions for determining a social similarity between the first user and the second user based on a result of the comparing.

14. The non-transitory computer-readable storage medium of claim 13, wherein the result indicates a degree of social similarity between the first user and the second user.

15. The non-transitory computer-readable storage medium of claim 13, wherein the result ranges from a first value to a second value, and wherein the closer the result to the second value higher is the degree of the social similarity between the first user and the second user.

16. The non-transitory computer-readable storage medium of claim 13, further comprising:
  instructions for sorting the set of connected clusters based on the quantity of the set of connected users assigned to each of the set of connected clusters to generate a sorted graph; and
  instructions for determining whether the first user is a spammer based on the sorted graph.

17. The non-transitory computer-readable storage medium of claim 13, wherein the instructions for categorizing the multiple users include:
  instructions for receiving information regarding the multiple users as a graph, wherein the multiple users are represented as nodes of the graph and an association between a pair of the multiple users is represented as an edge between nodes corresponding to the pair; and
  instructions for recursively splitting the graph into an equal number of partitions until the specified number of clusters is formed, the specified number of clusters being leaf nodes of a tree data structure formed as a result of the splitting.

18. The non-transitory computer-readable storage medium of claim 17, wherein the instructions for determining the social similarity include:
  instructions for identifying a pair of nodes corresponding to the clusters to which the first user and the second user are categorized;
  instructions for determining a common parent node of the pair of nodes; and
  instructions for determining the social similarity as a function of hierarchical distance between the pair of nodes and the common parent node.

19. The non-transitory computer-readable storage medium of claim 17, wherein the instructions for determining the social similarity include:
  instructions for identifying a first set of nodes corresponding to the clusters to which the multiple users are categorized;
  instructions for identifying a second set of nodes corresponding to a second set of users associated to which the second user is categorized; and
  instructions for determining the social similarity by applying a similarity function on the first set of the nodes and the second set of the nodes.

20. A system, comprising:
  a central processing unit;
  a first component configured to, when executed by the central processing unit, receive information regarding multiple users, each of the users having one or more user characteristics that identify the corresponding user;
  a second component configured to, when executed by the central processing unit, categorize the multiple users into a specified number of clusters, wherein each of the multiple users is assigned to one respective cluster of the specified number of clusters based on the user characteristics of the corresponding user;
  a third component configured to, when executed by the central processing unit, determine a set of connected users of the multiple users, each of the set of connected users being connected to a first user via a social networking platform;
  a fourth component configured to, when executed by the central processing unit, determine a set of connected clusters of the specified number of clusters, each of the set of connected clusters having assigned to it a respective connected user of the set of connected users; and
  a fifth component configured to, when executed by the central processing unit, generate a first social signature for the first user, wherein the first social signature is a vector of multiple elements, each of the multiple elements corresponding to a connected cluster of the set of connected clusters and indicating a quantity of connected users of the set of connected users assigned to a respective connected cluster, wherein the first social signature is indicative of the user characteristics identifying the set of connected users.

* * * * *